3,557,136
ACYLOXYALKYL SUBSTITUTED OXAZOLINES
Alan J. Levy and Morton H. Litt, Morristown, N.J., assignors to Allied Chemical Corporation, New York, N.Y., a corporation of New York
No Drawing. Original application Apr. 17, 1967, Ser. No. 631,194, now Patent No. 3,483,145, dated Dec. 9, 1969. Divided and this application July 16, 1969, Ser. No. 857,254
Int. Cl. C07d 85/36
U.S. Cl. 260—307
4 Claims

ABSTRACT OF THE DISCLOSURE

This invention relates to novel oxazolines having acyloxyalkyl substituents on the 2-position.

CROSS-REFERENCE TO RELATED APPLICATION

This application is a divisional of copending application Ser. No. 631,194 filed Apr. 17, 1967, now U.S. Pat. 3,483,145.

In accordance with the present invention, novel 2-substituted-2-oxazolines have been discovered which contain acyloxyalkyl groups as the 2-substituent. These compounds are represented by the formula

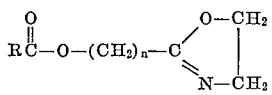

wherein R represents an alkyl, aryl, alkaryl or aralkyl radical, and $n$ is an integer from 1 to 15. Preferably R represents a radical having up to 12 carbons with particularly outstanding results being obtained when R is an alkyl group of from 1 to 5 carbon atoms. These compounds can be polymerized to form polymers having recurring units of the formula

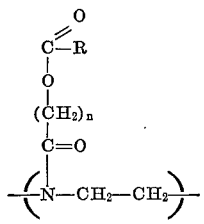

wherein R and $n$ are as defined above. These polymers have an acyloxyalkyl group side chain on each and every nitrogen atom in the backbone. The polymers are amorphous when $n$ has a value of 1 to 8. Polymers of the above formula can be modified by heating them with alkali to replace the acyl groups with hydroxy groups.

The compounds of this invention can be prepared by cyclodehydrohalogenation of the corresponding N-($\beta$-haloethyl)amides. These N-($\beta$-haloethyl)amides can be prepared from the corresponding acyloxyalkyl acid chloride or acid bromide by reaction with ethylenimine, as illustrated in the following equation:

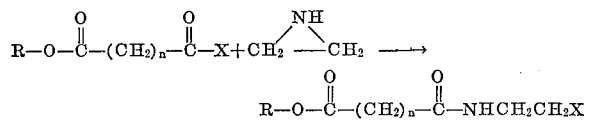

where X is chlorine or bromine and $n$ and R have the meanings given above. Cyclodehydrohalogenation can be carried out according to known methods such as those described by Wiley et al. in Chem. Reviews, 44, 447–475 (1949), whereby the amide is reacted with sodium hydroxide or potassium hydroxide in aqueous or water/alcohol solutions. Alternately, and preferably, the N-($\beta$-haloethyl)amide is reacted with anhydrous sodium carbonate at a temperature high enough to recover the desired heterocyclic iminoethers by distillation. This method is disclosed in a copending patent application U.S. Ser. No. 450,163 of Taghi G. Bassiri filed Apr. 22, 1965, now U.S. Pat. 3,331,851.

The polymerization of the heterocyclic iminoethers of the invention can be carried out by heating them in an inert atmosphere in the presence of a cationic catalyst such as alkyl halides, boron-fluorine compounds, antimony-fluorine compounds, strong acids, salts of strong acids with an oxazoline or an oxazine, carbonic acid anhydrides, iodine, esters of strong acids, strongly acidic ion exchange resins, acid activated clays, tin halides and aluminum halides. Illustrative of catalysts that can be employed are methyl iodide, 1,4-dibromobutane, boron trifluoride etherate, antimony pentafluoride, p-toluene sulfonic acid, sulfuric acid, nitric acid, perchloric acid, hydrobromine acid, hydroiodic acid, dimethyl sulfate, methyl p-toluene sulfonate, the salt of 2-phenyl-2-oxazine with perchloric acid, aluminum chloride, tin chloride and the perchlorate salt of 2-(p-chlorophenyl)-2-oxazoline. In general, a mol ratio of about 10 to about 10,000 mols of monomer per mol of catalyst will be employed. Increasing the catalyst concentration will tend to lower the molecular weight of the resultant polymer. The temperature at which the polymerization is carried out may range from about 80° C. to about 250° C.; the preferred temperature range is from about 100° to about 200° C. The time required to polymerize the monomers of the invention may vary from several minutes to several days depending upon the reactivity of the monomer, the temperature of polymerization, the type of catalyst and its concentration and the desired molecular weight. Increasing the time of polymerization usually increases the molecular weight of the resultant polymer.

In carrying out the polymerization, a single monomer can be used to produce a homopolymer, or two or more different monomers within the scope of the invention can be used to produce copolymers. Additionally, a modification of the polymers of the invention can be obtained if the monomers defined herein are admixed with one or more monomers of the formula

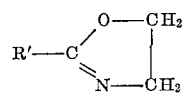

wherein R' represents a hydrocarbon radical such as alkyl, aryl, aralkyl, alicyclic and alkenyl groups or a halogenated hydrocarbon radical. Preferably R is alkyl of 1 to 20 carbon atoms such as methyl, isobutyl, pentyl, heptyl, undecyl and heptadecyl; halogenated alkyl of 1 to 20 carbon atoms such as dichloromethyl; trichloromethyl, pentafluoroethyl and pentadecafluoroheptyl; aryl such as phenyl and naphthyl; halogenated aryl such as p-chlorophenyl; aralkyl such as benzyl; alkylaryl such as tolyl; saturated alicyclic such as cyclohexyl and alkylene such as decenyl.

The properties of the polymers of the invention vary with the length of the alkylene group in the side chain. The polymers which are amorphous are soluble in common solvents such as methanol, ethanol, chloroform, ethylene glycol, chlorobenzene, xylene, benzene, naphthenes and alkanes such as decane and dodecane, and they can be solution cast into films. As the number of carbon atoms in the polymer side chain increases, the polarity tends to diminish and solvents of decreasing polarity are preferably selected. The hard polymers can be used for molding compositions and the like. Those polymers that are soft are useful as adhesives and as coatings and sizes for fabrics and paper.

In addition, the polymers described above can be hydrolyzed in solution with a base to form the corresponding hydroxy-substituted polymers which have linear backbone chains and are composed of recurring units of the formula

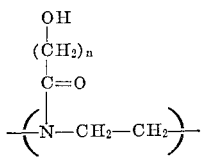

wherein $n$ has the meaning given above. Suitable bases include alkali metal hydroxides such as sodium hydroxide and potassium hydroxide. The hydrolyzed polymers are crystalline and can be drawn into fibers useful in the manufacture of textiles. Some of these polymers are water soluble and are useful as thickening agents in water-soluble paints and aerosols.

The invention can be further illustrated by the examples given below, but it is to be understood that the invention is not meant to be limited to the details described therein.

In the examples, all percent is by weight. The reduced viscosities of the polymers were determined as 0.5% by weight solutions in m-cresol at 25° C.

Example 1

428.4 grams (3.6 mols) of thionyl chloride were added slowly to 329.1 grams (1.95 mols) of 6-acetoxyhexanoic acid, maintained at 35°–45° C. for 3 hours and allowed to stand at room temperature overnight. Excess thionyl chloride was distilled off and the product distilled under vaccum.

6-acetoxyhexanoyl chloride was obtained in 40% yield as a clear, colorless liquid having a boiling point of 87°–94° C./0.5 mm. Infrared analysis confirmed the proposed structure.

The results of elemental analysis were calculated for $C_8H_{13}O_3Cl$ (percent): C, 50.0; H, 6.8; Cl, 18.4. Found (percent): C, 49.7; H, 6.8; Cl, 18.7.

100 grams (0.52 mol) of 6-acetoxyhexanoyl chloride, as prepared above, was charged to a one-liter flask fitted with a stirrer and a reflux condenser. 700 milliliters of ethyl ether were added and 22.4 grams (0.52 mol) of ethylenimine dissolved in 150 ml. of ether were added at such a rate as to maintain the solution at reflux. After the addition was finished, anhydrous hydrochloric acid was bubbled through the solution for 5 minutes. Upon evaporation of the solvent, 105.7 grams (86.3% yield) of product was obtained which was recrystallized twice from ether.

The final product was a white solid having a melting point of 38.5°–39.5° C. and was determined to be N-($\beta$-chloroethyl)-6-acetoxyhexanamide.

Elemental analysis calculated for $C_{10}H_{18}NO_3Cl$ (percent): C, 51.0; H, 7.6; N, 6.0; Cl, 15.0. Found (percent): C, 50.7; H, 7.8; N, 6.2; Cl, 14.7.

35.3 grams (0.15 mol) of N-($\beta$-chloroethyl)-6-acetoxyhexanamide and 11 grams (0.105 mol) of powdered sodium carbonate were charged to a flask fitted with a stirrer and distillation head and connected to a vacuum source. The system was brought to 0.5 mm. Hg pressure and heated to 80° C. when a gas was evolved and the pressure increased slightly. When the gas evolution subsided, a clear, odorless liquid distilled at 114°–119° C./ 0.5 mm.

The product, 2-(5-acetoxypentyl)-2-oxazoline, was obtained as a liquid in 46% yield. The product was redistilled at 76° C./0.03 mm. It had an index of refraction $n_D^{22°\ C.}$ 1.4559.

Example 2

The general procedure of Example 1 is repeated substituting 1.95 mols of other 6-acyloxyhexanoic acids for the 6-acetoxyhexanoic acids. The starting materials and the products obtained are listed in the following table.

TABLE

| Starting material | Product |
|---|---|
| 6-pentanoyloxyhexanoic acid. | 2-(5-pentanoyloxypentyl)-2-oxazoline. |
| 6-benzoyloxyhexanoic acid. | 2-(5-benzoyloxypentyl)-2-oxazoline. |
| 6-(p-toluyloxy)hexanoic acid. | 2-[5-(p-toluyloxy)pentyl]-2-oxazoline. |
| 6-phenylacetoxyhexanoic acid. | 2-(5-phenylacetoxypentyl)-2-oxazoline. |
| 6-lauroyloxyhexanoic acid. | 2-(5-lauroyloxypentyl)-2-oxazoline. |

Example 3

The general procedure of Example 1 is repeated substituting 1.95 mols of 6-acetoxydodecanoic acid for the 6-acetoxyhexanoic acid. The product obtained is 2-(5-acetoxyundecycl)-2-oxazoline.

Example 4

114.9 grams (0.84 mol) of 2-acetoxyacetyl chloride and 300 ml. of ether were charged to a flask fitted with a stirrer, addition funnel and reflux condenser. 36.2 grams (0.84 mol) of ethylenimine were added over a 2-hour period. The temperature reached 30° C. The solution was then cooled in a Dry Ice-acetone bath. A white solid was collected by filtration and recrystallization from ether.

N-($\beta$-chloroethyl)-2-acetoxyacetamide was obtained in 98% yield. It had a melting point of 68.5°–70.5° C. This product was charged to a flask fitted with a distillation head and 87.2 grams (0.82 mol) of anhydrous sodium carbonate added. The mixture was heated at 65–115° C. under 17 mm. Hg pressure and 107.5 grams of a clear, colorless liquid distilled over. This crude product was redistilled at 57° C./0.05 mm. of Hg to give 2-acetoxymethyl-2-oxazoline having the following elemental analysis: Calculated (percent): C, 50.3; H, 6.3; N, 9.8. Found (percent): C, 50.5; H, 6.3; N, 9.7.

Example 5

Portions of 2-(5-acetoxypentyl)-2-oxazoline, as prepared in Example 1, were distilled into two polymerization tubes. p-Chlorophenyl oxazolinium perchlorate was added as catalyst at a mol ratio of monomer to catalyst of 120:1 in the first tube and 1080:1 in the second. The tubes were degassed and sealed.

The first tube was placed in an oil bath at 115° C. for 4 hours and 20 minutes. The product, poly [N-(6-acetoxyhexanoyl)ethylenimine] was a soft yellow polymer. It had a reduced viscosity of 0.21.

The second tube was placed in an oven at 150° C. for 24 hours. Poly[N-(6-acetoxyhexanoyl)ethylenimine] was obtained as a clear polymer having a reduced viscosity of 1.47.

Example 6

Portions of the 2-substitteud-2-oxazolines prepared in Examples 2 and 3 are distilled into polymerization tubes and admixed with p-chlorophenyl oxazolinium perchlorate catalyst at a monomer-to-catalyst mol ratio of 1080:1. The tubes are degassed, sealed and heated at 150° C. for 24 hours to form polymeric products. The polymers are as follows:

| Monomer | Polymer |
|---|---|
| 2-(5-pentanoyloxypentyl)-2-oxazoline. | Poly[N-(6-pentanoyloxyhexanoyl)ethylenimine]. |
| 2-(5-benzoyloxypentyl)-2-oxazoline. | Poly[N-(6-benzoyloxyhexanoyl)ethyleneimine. |
| 2-[5-(p-toluyloxy)pentyl]-2-oxazoline. | Poly[N-(6-p-toluyloxyhexanoyl)ethylenimine]. |
| 2-(5-phenylacetoxypentyl]-2-oxazoline. | Poly[N-(6-phenylacetoxyhexanoyl)ethylenimine]. |
| 2-(5-lauroyloxypentyl)-2-oxazoline. | Poly[N-(6-lauroyloxyhexanoyl)ethylenimine]. |
| 2-(5-acetoxyundecyl)-2-oxazoline. | Poly[N-(6-acetoxydodecanoyl)ethylenimine]. |

Example 7

Portions of 2-acetoxymethyl-2-oxazoline, prepared as in Example 4, were distilled into two polymerization tubes and p-chlorophenyl oxazolinium perchlorate catalyst added at a mol ratio of monomer-to-catalyst of 500:1 and 1300:1 respectively. The first tube was placed in an oven at 130° C. for 15 minutes. A yellow-brown solid polymer was obtained having a reduced viscosity of 0.34.

The second tube was heated at 80° C. for 17 hours. A clear yellow solid was obtained. The polymer had a reduced viscosity of 0.37.

The polymers were slightly soluble in water and soluble in methanol and ethylene glycol.

Infrared analysis of both polymers confirmed the structure of poly[N-(2-acetoxyethanoyl)ethylenimine].

Example 8

2.78 grams (0.0197 mol) of poly[N-(2-acetoxyethanoyl)ethylenimine] were added to 50 ml. of water and 0.78 gram (0.0197 mol) of sodium hydroxide was admixed therewith. When all the base was used up, as shown by an acid base indicator, the solvent was evaporated and the polymer precipitated with methanol. The polymer was dried in a vacuum oven.

The product, poly[N - (2 - hydroxyethanoyl)ethylenimine], had a reduced viscosity of 0.21.

The structure was confirmed by infrared analysis. X-ray examination indicated a crystalline polymer.

Example 9

A portion of poly[N-(6-acetoxyhexanoyl)ethylenimine] having a reduced viscosity of 1.47 prepared as in Example 5 was disolved in ethanol and refluxed with an excess of sodium hydroxide. After about 5 minutes, a white solid precipitated. After cooling to room temperature, the solid was filtered off and dried overnight at 45° C. under vacuum. It was identified as sodium acetate.

The filtrate was treated with ether and the white, powdery solid which precipitated was collected and dried under vacuum.

The product had a reduced viscosity of 1.47. The structure of poly[N-(6-hydroxyhexanoyl)ethylenimine] was confirmed by infrared analysis. An X-ray spectrum indicated the polymer was crystalline. Differential thermal analysis confirmed the crystallinity of the polymer which had a melting point of about 300° C. It was soluble in water, trifluoro ethanol, methanol, formic acid, m-cresol and n-butanol at room temperature and dimethylformamide and pyridine at 100° C. It was insoluble in chloroform, carbon tetrachloride, ethyl acetate, amyl acetate, decaline and hexane.

We claim:
1. A compound of the formula

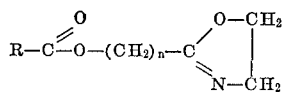

wherein R is a member selected from the group consisting of alkyl, aryl, alkaryl and aralkyl radicals of up to 12 carbon atoms and $n$ is an integer from 1 to 15.

2. A compound according to claim 1 wherein R is an alkyl radical having from 1 to 5 carbon atoms.

3. A compound according to claim 1 wherein R is a methyl group and $n$ is 5.

4. A compound according to claim 1 wherein R is a methyl group and $n$ is 1.

References Cited

UNITED STATES PATENTS 2,372,409   3/1945   Tryon _____ 260—307

ALTON D. ROLLINS, Primary Examiner